2,973,329

ALUMINA TRIHYDRATE PREPARATION

John H. Koch, Jr., Nutley, N.J., assignor, by mesne assignments, to Engelhard Industries, Inc., Newark, N.J., a corporation of Delaware No Drawing. Filed Mar. 12, 1959, Ser. No. 798,816

9 Claims. (Cl. 252—463)

This invention relates to the production of alumina trihydrate compositions having particular value as a precursor hydrous alumina in the production of calcined alumina based catalysts of the type set forth in U.S. Patents Nos. 2,838,444 and 2,838,445. More particularly, the present invention is concerned with the production of alumina trihydrate compositions wherein the randomite form of alumina trihydrate is the major alumina trihydrate component and which when calcined provide catalytically active materials.

Randomite, also known as nordstrandite and bayerite II, is described in Nature, vol. 177, pages 713–714, April 14, 1956. It is characterized by a line at 4.79 Angstrom units as determined by X-ray diffraction analysis (Cu radiation). For instance, when a sample of the alumina trihydrate composition is dried at about 110° C. and subjected to X-ray diffraction analysis with a 90° Norelco X-ray diffraction machine, a line may be observed at 4.79 Angstrom units. This is distinguished from other forms of alumina trihydrate present in the compositions produced by the present process such as gibbsite and bayerite which give lines at 4.85 and 4.73 Angstrom units, respectively. All three of the mentioned forms of alumina trihydrate are crystalline in character, with crystallites of about 300 to 1000 Angstrom units in size although the bayerite crystallites may range somewhat larger. When the randomite is calcined at high temperatures it is converted partially to the eta form of gamma alumina and gives a weak X-ray line at 4.5 Angstrom units or 19.5 degrees on a spectrometer with copper radiation. The remaining hydrous alumina present in the compositions produced by the present process is of amorphous hydrous alumina form or a monohydrate (AlO·OH) corresponding after drying to boehmite which is of very small crystallite size and which gives broad X-ray diffraction lines.

Alumina trihydrate compositions containing randomite in substantial proportions as precursor bases for calcined alumina base catalysts are described in application Serial No. 535,516, filed September 20, 1955, now U.S. Patent No. 2,938,211 by Robert A. Van Nordstrand, Anna P. Hauel, Carl D. Keith and John W. Teter. As described in that application the alumina prescursor composition is produced from an alumina hydrogel which may be formed by precipitating gelatinous hydrous alumina from a water solution of a soluble, inorganic acid aluminum salt such as aluminum chloride by means of an inorganic base neutralizing or precipitating agent such as ammonium hydroxide. Aqueous ammonium hydroxide can be added to the aluminum chloride solution until a pH of about 8 has been reached while stirring the mixture vigorously. Following the precipitation, the precipitate is separated and washed with water in order to obtain the precipitate substantially free of contaminating ions, e.g. chloride ions in the case of aluminum chloride, to a low limit, usually less than about 0.2 wt. percent. The washing is controlled at temperatures above about 110° F., usually about 130 to 140° F., and at a pH generally within the range of about 7 to 9 or 10. The washed precipitate is usually converted by aging as long as necessary in an aqueous medium, and/or by seeding, from the initial predominantly amorphous and/or monohydrate stages, to a mixture predominating in the crystalline trihydrate forms of alumina. When employed as a catalyst base precursor, the aged hydrate can be treated with a source of catalytic material such as one of platinum, in order to incorporate the catalytic material in finely dispersed condition in the mass, as by precipitating platinum sulfide in situ from chloroplatinic acid with aqueous hydrogen sulfide or as by treating the hydrate composition with a colloidal platinum sulfide sol. The resulting composition is dried and calcined.

The trihydrate phase produced by this process contains forms as determined by X-ray diffraction analysis of dried samples corresponding to gibbsite, bayerite and randomite. The precursor base also contains a minor amount, for instance about 5 to 35 weight percent, of other hydrous aluminas in the form of alumina monohydrate, e.g. boehmite, as detected by X-ray analysis after drying, or in the form of amorphous hydrous alumina or mixtures of these forms. In this process, an extended period, as for example about 19 days, was required to produce a composition including about 89 weight percent of alumina trihydrate of which about 64 weight percent was randomite.

The present invention is based upon the discovery that by contacting the alumina hydrogel with hydrazine, the above described process is substantially expedited towards giving the compositions predominating in trihydrate and with said trihydrate containing a major amount of randomite. The present discovery can be practiced as follows:

The predominantly amorphous or monohydrate hydrogel is precipitated as through the addition of ammonium hydroxide to an aqueous aluminum chloride solution, and the hydrogel is contacted with hydrazine in amounts to accelerate the formation of an alumina trihydrate composition predominating in trihydrate, e.g. containing from about 65 to 95% of trihydrate, in which the major proportion of the trihydrate is randomite. Generally from about 0.5 to 15 weight percent hydrazine based on the alumina on a dry basis and preferably about 2 to 12 weight percent hydrazine is employed. The hydrazine can be employed in the form of hydrazine hydrate or a solution, e.g. 85 percent hydrazine hydrate aqueous solution, and can be contacted with the hydrogel before or during the removal of contaminating ions, for instance, during the washing procedure when the hydrogel contains generally from about 25 percent to 2 percent, of contaminating ions, e.g. chloride ions. The hydrazine is added prior to substantial formation of trihydrate in the hydrogel and generally the trihydrate content at the time of hydrazine addition is less than about 5 weight percent as was the case in the specific examples which follow. An advantageous modification of this discovery includes, in addition to contacting the hydrogel with hydrazine, converting e.g. by aging, the hydrogel to the alumina trihydrate compositions containing randomite in substantial proportions at a temperature generally from about 30 to 90° C. and preferably from about 40 to 80° C. There is no necessity however for conducting the washing of the hydrogel at elevated temperatures although this can be done.

The alumina trihydrate compositions produced by the process of the present invention can be advantageously employed as the alumina base precursor in the catalyst described in U.S. Patents Nos. 2,838,444 and 2,838,445. As described in 2,838,444 patent, a catalyst having a calcined alumina base produced from a mixture of precursor hydrous alumina phases containing from about 65 to 95 weight percent alumina trihydrate possesses a number of significant advantages in use as a reforming catalyst or a catalyst for producing aromatics. The finished catalyst contains gamma alumina modifications and has a base structure characterized by large pore volume, e.g., greater than about 0.1 cc. per gram of its pore volume in pores of more than 100 Angstrom units in size, high surface area, e.g. about 350 to 550 square meters per gram, when the precursor alumina hydrate composition is dried and calcined; and it contains about 0.1 to 1.5% by weight of a platinum metal component present in sufficiently finely distributed form as to exhibit by X-ray diffraction analysis the substantial absence of crystallites greater in size than about 50 Angstrom units. Greater amounts of platinum whether detectable or undetectable by X-ray analysis show no advantage justifying the expense. The calcined catalyst contains generally upwards of about 2% by weight of matter volatile at 1100° C. and if calcined at 900° F. with dry air and cooled with dry air, such volatile matter constitutes from about 2 to about 5% of the weight of the catalyst. The catalysts have high activity including unusually high dehydrocyclization activity, low rates of activity decline and can be regenerated by oxidative means.

As set forth in the above-mentioned application, when a high randomite containing alumina trihydrate composition of this type is used as a precursor in the preparation of a platinum group VIII metal-alumina catalyst, the resulting catalyst has particularly high activity combined with surprisingly extended catalyst life in catalytic reforming operations designed to convert virgin naphthas of low octane to high octane gasoline stocks and to produce aromatics from selected gasoline fractions. The proportion of predominating trihydrates in the precursor composition preferably should approximate about 65 to 95 weight percent. The proportion of randomite in the trihydrate mixture should exceed about 50 weight percent of the trihydrates.

The platinum group metal-alumina catalyst can be prepared by incorporating a platinum group metal through mixing the alumina component with the desired amount of platinum group metal in the form of a soluble or colloidally dispersible compound. For example, chloroplatinic acid may be added to the slurry and precipitated by introduction of hydrogen sulfide in aqueous solution. Alternatively, the platinum may be introduced in the form of a sulfide sol. The platinum-group metal alumina containing composition is dried as by spray, oven or drum drying. The dried composition then may be formed into tablets or pills or may be rewetted and extruded to particles of desired size. The resulting catalyst particles can be calcined by heating to about 800° to 1200° F. or more for a period of about 3 to about 12 hours in an atmosphere of a flowing free oxygen-containing gas. Before use, the catalyst can be reduced by subjecting it to flowing hydrogen at about 800° to about 1100° F. for a period up to several hours.

The crystalline nature of the trihydrate precursor base composition is important from a number of aspects. When the platinum metal is incorporated in the base structure, it appears to enter into combination with, or actually dissolve or disappear into the alumina structure. For after calcination in the presence of air, X-ray diffraction analysis indicates the substantial absence of platinum crystallites of size greater than 50 Angstrom units.

The crystalline character of the trihydrate precursor base also results in a characteristic large pore, high area structure for the calcined alumina catalyst. The catalyst will generally have about 0.1 to 0.5 cc. per gram preferably about 0.15 to 0.3 cc. per gram of the total pore volume as determined by BET nitrogen adsorption analysis in pores greater than about 100 Angstrom units in size. The complete adsorption isotherm indicates a number of fine pores in the less than 20 Angstrom range, a substantial volume in pores in the 20 to 100 Angstrom range and with the bulk of the remaining pores distributed over the 100 to 1,000 Angstrom range. Catalysts made from amorphous or monohydrate type alumina precursor base compositions ordinarily have substantially no pores less than 20 Angstroms in size but have the bulk of the pore volume in the 20 to 40 Angstrom units size range. Most of the remaining pores are ordinarily less than 100 Angstrom units in size.

The following examples will serve to illustrate the invention but they are not to be considered limiting.

EXAMPLE I

A 920 ml. portion of $AlCl_3$-deionized water solution (equivalent to 13% or 120 grams $Al_2O_3$) was diluted with 3 liters of distilled water and stirred with a wooden propeller in an 8-liter jar. A 1:1 $NH_4OH$ solution (equivalent to 14% $NH_3$) was added at a rate of about 35 cc. per minute. At pH 4.8 the slurry thickened and $NH_4OH$ addition was stopped until it thinned down for easy stirring again; 822 ml. of $NH_4OH$ solution had been added. An additional 138 ml. was added, bringing the pH to 7.9. The slurry was then filtered on two 10-inch Buchner funnels, washed rapidly, and a representative chloride sample of the filter cake taken. This assayed 21.3% Cl based on $Al_2O_3$.

The cake was immediately reslurried in 5 liters of water. 11 grams of hydrazine hydrate diluted to 200 ml., were added slowly to a one-half portion of the slurry, designated M331, with stirring. This corresponds to 10% hydrazine based on $Al_2O_3$. The slurry pH was raised by the hydrazine addition from 7.7 to 8.2. 115 ml. of 1:1 $NH_4OH$ solution were now added, raising the pH to 9.3 and the slurry was washed on a 10-inch Buchner funnel. After the second wash a representative portion of the filter cake contained 11.1% Cl. The cake was reslurried in water to a two-quart volume. The precipitation and the two washings were completed in about six hours. A portion of this slurry was withdrawn and allowed to stand overnight at room temperature. In the morning, this portion of slurry was given two further washes to a chloride content of about 1-2% and was aged at a temperature of 50° C. After aging, the alumina hydrate was recovered and the resulting hydrate distributions are indicated in Table I below for base composition "A" and other bases made. In Table I, bases A, B and C were held overnight at room temperature for A and 50° for B and C after the hydrazine addition and partial washing to about 10% Cl⁻. This procedure gave a higher randomite to total trihydrate ratio, and I thus prefer to hold the hydrogel containing the hydrazine for at least several hours e.g. up to 72 hours or longer, at a contaminating ion concentration in the range of about 2 to 25% and at a temperature of about 30° to 90° C.

Table I

X-RAY DIFFRACTION COMPOSITION DATA FOR ALUMINAS WITH HIGH PERCENTAGES OF RANDOMITE

| Base Designation | A | B | C | D | E |
|---|---|---|---|---|---|
| Base Type | M 331 | M 331 | M 332 | M 332 | M 320 |
| Aging Temperature | 50° | 50° | 50° | 50° | 75° |
| Percent Hydrazine Added | 10 | 10 | 10 | 10 | 10 |
| Percent Chloride Present | 10 | <2 | <2 | 11.1 | <2 |
| Days Since Hydrolysis | 15 | 7 | 15 | 15 | 7 |
| Composition, Percent [1]: | | | | | |
| Boehmite | 17 | 21 | 23 | 30 | 9 |
| Bayerite | 8 | 17 | 11 | 0 | 12 |
| Randomite | 60 | 57 | 66 | 35 | 70 |
| Gibbsite | 0 | 0 | 0 | 11 | 9 |
| Total Trihydrate | 68 | 74 | 77 | 46 | 91 |
| Remarks | washing to 21.3% Cl fast, followed by hydrazine. | washing to 21.3% Cl fast, followed by hydrazine. | washing to 11.1% Cl fast, followed by hydrazine. | no washing after hydrazine addition. | washing to about 10% Cl fast, hydrazine added after 1 wash at about 20% Cl. |

| Base Designation | F | G | H | I | J |
|---|---|---|---|---|---|
| Base Type | M 325 | M 325 | M 337 | Res. 104-B | Res. 104-K |
| Aging Temperature | 50° | 75° | 50° | | |
| Percent Hydrazine Added | 10 | 10 | 3 | 10 | 10 |
| Percent Chloride Present | <2 | <2 | 5.2 | 0.2 | 0.2 |
| Days Since Hydrolysis | 7 | 7 | 6 | 5 | 9 |
| Composition, Percent [1]: | | | | | |
| Boehmite | 22 | 18 | 35 | 25 | 21 |
| Bayerite | 18 | 27 | 14 | 14 | 11 |
| Randomite | 43 | 50 | 40 | 55 | 68 |
| Gibbsite | 7 | 5 | 11 | 0 | 0 |
| Total Trihydrate | 68 | 82 | 65 | 69 | 79 |
| Remarks | washing to about 20% Cl fast, followed by hydrazine addition. Further washing next day. | washing to about 20% Cl fast, followed by hydrazine addition. Further washing next day. | no washing after hydrazine addition. | washing after hydrazine addition as described in Example VII. | washing after hydrazine addition as described in Example VII. |

[1] Compositions were determined in terms of strongest X-ray diffraction lines, as follows: boehmite at 6.15 A., bayerite at 4.73 A., randomite at 4.79 A. and gibbsite at 4.85 A. with bayerite also determined separately at 2.21 A. The quantities of each were compared against standards in terms of peak planimeter areas.

EXAMPLES II TO VI

Base compositions B through H (see Table I) were prepared in essentially the same manner as base composition A except for the variable conditions, e.g. aging temperature and washing procedure, noted under the appropriate captions in Table I.

EXAMPLE VII

Base composition I (see Table I) was prepared by precipitation at a controlled pH of about 8.8 by flowing streams of aluminum chloride and ammonium hydroxide solutions together in a pipe. This base was washed to give a chloride content of 4.4% at the time of the hydrazine addition. After the hydrazine addition, the base was allowed to stand for four days at 50° C., at which time Composition I was determined. It was then washed on a "Sperry" rubber filter press to 0.2% Cl⁻. After further aging of four days at about 30° C. there resulted base composition J, also shown in Table I, which was employed in the preparation of catalyst Res. 104-K765, as described in Example VIII below.

EXAMPLE VIII

Catalyst Res. 104-K765 containing about 0.6% Pt was prepared as follows with materials including (a) 11.48 kg. (Res. 104) alumina base "J" slurry (=6.74% or 0.774 kgs. $Al_2O_3$), (b) 46.5 ml. $H_2PtCl_6$ solution (=10% or 4.65 gms. Pt), and (c) 1070 ml. saturated $H_2S$ water. The $H_2PtCl_6$ solution was added, with stirring, slowly to the alumina slurry, followed by slow addition of the $H_2S$ water. The final pH of the resulting catalyst mixture was 5.7. The catalyst mixture was drum-dried, extruded through 1/16" holes, and calcined at a top temperature of 480° C. in a dry, flowing air stream. The product contained a high precentage of eta alumina including 4.0% volatile material at 1100° C. The calcined catalyst, designated Res. 104-K765-E2C, had a surface area of 523 square meters per gram (by an X-ray method calibrated against B.E.T.). Its total pore volume was determined to be 0.514 ml. per gram, and the rolling weight crushing strength of pellets of the catalyst averaging 1/8" long was 16 pounds.

EXAMPLE IX

Catalyst Res. 104-K765-E2C was evaluated in the "Dropping Space Velocity" reforming test. This test includes reforming a petroleum naphtha (Research Octane Number 35 to 40) over a period of 114 hours at a temperature of about 933° F., 200 p.s.i.g. pressure, and 10 to 1 recycle gas (predominantly hydrogen) to naptha mole ratio while dropping the space velocity from an initial 3 WHSV by about 10% every 24 hours. The space velocity is then returned to 3 WHSV for 24 hours. Thereafter, the temperature is raised to 953° F. and 3 successive 12-hour samples are taken. Results of this test with catalyst Res. 104-K765-E2C are given below.

| Hrs. on Stream | Research Octane No. of Liquid Product (Wiese Formula) |
|---|---|
| 36 | 100.7 |
| 60 | 101.1 |
| 108 | 101.8 |
| 132 | 98.2 |
| 148 | 101.4 |
| 172 | 100.7 |

Contrasting the rapid production of trihydrate predominating in randomite as illustrated by the above examples, when a similar alumina preparation was made by the method of application Serial No. 535,516 in the absence of hydraine the results were as follows:

Table II

| Sample Designation | Days Since Hydrolysis | Composition | |
|---|---|---|---|
| | | Percent Randomite | Percent Total Trihydrate |
| 516-133-F | 19 | 50 | 79 |
| 516-134-F | 37 | 41 | 77 |
| 516-144-F | 26 | 54 | 77 |
| 516-145-F | 18 | 43 | 65 |
| 516-151-D | 21 | 56 | 72 |

I claim:
1. In the production of alumina trihydrate compositions by a process comprising the formation of an alumina hydrogel, predominating in material selected from the group consisting of amorphous hydrous alumina, alumina monohydrate and their mixtures, washing the hydrogel with water until substantially free of contaminating ions, and converting the hydrogel to an alumina hydrate composition predominating in alumina trihydrate of which the major proportion is randomite, the method of hydrate conversion which comprises contacting the hydrogel with hydrazine in an amount and for a period of time sufficient to accelerate the formation of said alumina trihydrate composition.

2. The method of claim 1 wherein the converted hydrate contains about 65 to 95% of alumina trihydrate.

3. The method of claim 2 wherein the hydrogel is converted to the alumina trihydrate composition at a temperature from about 30° C. to 90° C.

4. The method of claim 3 wherein the alumina hydrogel is formed by the addition of an inorganic neutralizing base to an equeous solution of an acidic inorganic aluminum salt, the hydrazine is employed in an amount of from about 0.5 to 15 weight percent based on the alumina on a dry basis.

5. The method of claim 4 wherein the alumina hydrogel is formed by contacting aluminum chloride and ammonium hydroxide in an aqueous medium.

6. In the production of alumina trihydrate compositions by a process comprising the formation of an alumina hydrogel containing from about 2% to 25% of contaminating ions and predominating in material selected from the group consisting of amorphous hydrous alumina, alumina monohydrate and their mixtures, washing the hydrogel with water until substantially free of contaminating ions, and converting the hydrogel to an alumina hydrate composition predominating in alumina trihydrate of which the major proportion is randomite, the step of hydrate conversion which comprises contacting the hydrogel containing from about 2 to 25% contaminating ions with hydrazine in an amount to accelerate the formation of said alumina trihydrate composition and holding the hydrogel containing hydrazine at about 30 to 90° C. for at least several hours prior to said washing and conversion to increase the randomite to total trihydrate ratio.

7. The method of claim 6 wherein the converted hydrate contains about 65 to 95% of alumina trihydrate.

8. The method of claim 7 wherein the alumina hydrogel is formed by the addition of an inorganic neutralizing base to an aqueous solution of an acidic inorganic aluminum salt, and the hydrazine is employed in an amount of from about 0.5 to 15 weight precent based on the alumina on a dry basis.

9. The method of claim 8 wherein the alumina hydrogel is formed by contacting aluminum chloride and ammonium hydroxide in an aqueous medium, the hydrazine is employed in an amount of from about 2 to 12 weight percent and the hydrogel containing hydrazine is held at about 40 to 80° C.

References Cited in the file of this patent
UNITED STATES PATENTS

| 2,156,903 | Ruthruff | May 2, 1939 |
| 2,838,444 | Teter et al. | June 10, 1958 |
| 2,874,130 | Keith | Feb. 17, 1959 |